Aug. 9, 1966  R. M. MITCHELL  3,265,255
INSERT FOR CONTAINERS
Original Filed July 13, 1961
FIG. 1
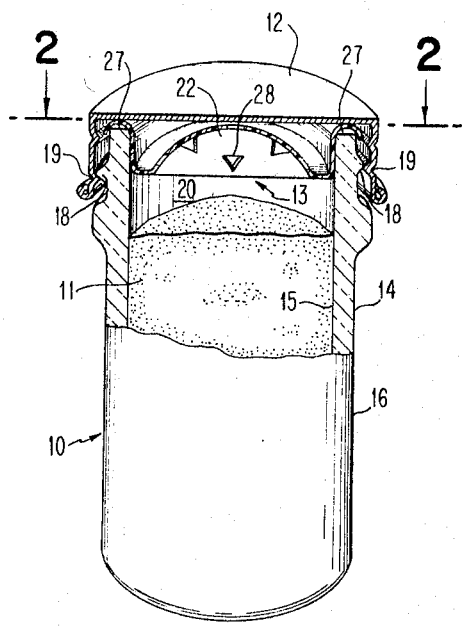
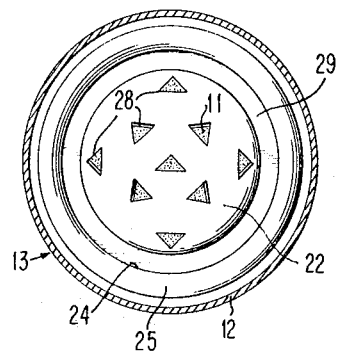
FIG. 2
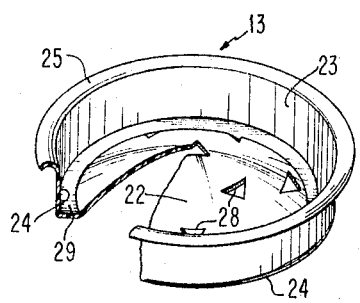
FIG. 3
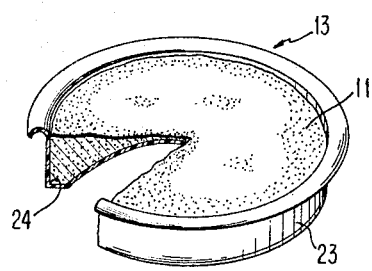
FIG. 4
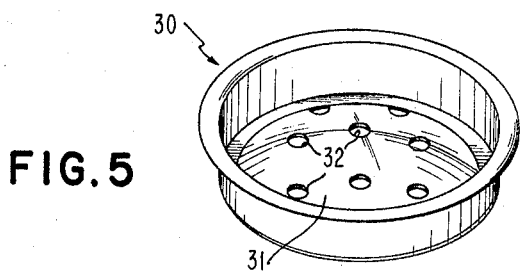
FIG. 5
INVENTOR
ROBERT M. MITCHELL
BY Frederick F. Made,
Michael J. Quillinan
and Walter D. Ames,
ATTORNEYS United States Patent Office 3,265,255
Patented August 9, 1966

3,265,255
INSERT FOR CONTAINERS
Robert M. Mitchell, South Norwalk, Conn., assignor to General Foods Corporation, White Plains, N.Y., a corporation of Delaware
Continuation of abandoned application Ser. No. 123,738, July 13, 1961. This application Apr. 12, 1965, Ser. No. 449,923
14 Claims. (Cl. 222—425)

This application is a continuation of my prior application of the same title, Serial Number 123,738, filed July 13, 1961, now abandoned.

This invention relates to an insert adapted to be positioned at the mouth of a container to provide dispensing means for the contents of the container. More specifically, the invention concerns such an insert which enables metered quantities of the container contents to be procured from the container.

It has long been found desirable to provide devices for delivering metered quantities of granular, pulverulent and similar fluent solid materials from a container. For example, devices in the form of measuring heads are well known for the purpose of obtaining metered amounts of sugar from a sugar jar. Such devices are conventionally in the form of cast metal covers which are screwed down over the top of the jar. The cover usually has a centrally located orifice through which sugar flows upon inversion of the jar. Instead of being discharged directly from the dispensing head upon such jar inversion, the sugar falls into an inverted cup mounted directly beneath the orifice. The cup has outwardly flared side walls, so that when the jar is subsequently returned to upright position, a large portion of the sugar in the inverted cup will not fall back into the jar through the orifice, but will follow the flared, side walls of the cup and fall beyond the orifice. Subsequent reinversion of the jar and the dispensing head permits the sugar to flow around the cup and from the jar cover or head through a discharge aperture.

While devices similar to that described hereinbefore as part of the prior art have proved acceptable, they suffer from several disadvantages. First, such devices are relatively expensive to manufacture. Even if they are formed from plastic and are injection molded, they must be molded in at least two parts, which are then assembled. Assembly adds considerably to the cost of the article. This expense results in their being sold as individual units and not in combination with powdered, soluble coffee, sugar, or other such pulverulent materials, measured quantities of which they are to deliver.

A further disadvantage which is most marked when the container contents to be delivered is a food product, is the fact that after use the dispensing head must be removed and cleaned and another, more restrictive cover disposed over the mouth of the jar or container. Dispensing heads of the type described do not protect a food product within the container from oxidation, access to insects, and exposure to other undesirable conditions. For example, it would prove completely impractical to permit such a dispensing head to remain in place over a jar of powdered, soluble coffee or like material which has effluent aroma and flavor characteristics. Since the container head does not seal the mouth of the jar from the ambient atmosphere, flavor and aroma characteristics are soon substantially depleted or lost if the head is allowed to remain in place. Where such a head serves to dispense sugar or other sacchariferous material, the discharge aperture of the head provides ready access to ants and other insects which are attracted by sugar crystals adhered to the facing of the aperture and to the inner surfaces of the walls of the head. It is possible for insects to pass through the discharge aperture and the orifice into the sugar jar itself.

Still another disadvantage which has substantially decreased the use of prior art dispensing heads is the difficulty of washing or otherwise cleaning the heads after use. In an inverted cup type of dispensing cover, for example, the cup is fixed in place within the cover and can be reached only with difficulty, even by means of scouring implements shaped for the purpose. Consequently, food and other particles tend to become lodged within the crevices of the cover or head, and these particles decay and attract insects. Still another disadvantage is that the dispensing head must be removed and cleaned after each day's use or even more frequently, and a separate cover maintained available for closing the open mouth of the jar during that time when the head is not in use.

It is a primary object of the present invention to provide an insert for containers having disposed therein fluent, solid materials, which insert in simple in structure so that it may be economically manufactured and sold as part of a combination including the container, cover, and contents of the container.

It is another object of this invention to provide such an insert which is so economical to manufacture that it can be discarded after the contents of the container have been dispensed. Such an insert may be formed from a plastic material which can be mass-produced by means of stamping or molding techniques.

It is a further object of this invention to provide a dispensing insert which can be positioned substantially entirely within the body of a container and which does not obstruct disposal of a container cover in place over the mouth of the container. Through such a construction the insert, itself, need not be removed from dispensing position to redispose the cover in container-closing location. Also, such a construction permits the insert to be sealed to the container rim and the insert, itself, sealed by an impermeable membrane. A tamper-proof seal is thereby provided as well as a gas barrier, the latter permitting vacuum packaging.

It is still a further object of this invention to provide an insert adapted to be positioned over the mouth of the container and against the periphery of the container mouth so that the insert additionally functions as a gasket to seal the contents of the container from the ambient atmosphere when the container cover is in closed position.

A general combination of elements which is contemplated within the scope of the present invention includes a container, such as a jar, for holding a quantity of a fluent, solid material within the container, a closure or cover for the container, and an insert located between the cover and surfaces of the container. The cover is removably disposed over the mouth of the container and may be a screw-down cover, such as is in common usage on jars of instant coffee. In the combination set forth the insert, which is formed with bottom and side walls, is disposed so that its bottom wall extends across the aperture or mouth of the container beneath the closure. The bottom wall has a plurality of apertures extending therethrough. The number, size, and spacing of these orifices will vary in accordance with the fluent solid material which is to be dispensed from the container. It can generally be said, however, that the orifices must have such dimensions and must be so spaced from each other that when the insert is in substantially upright position and is filled with the fluent solid, no substantial quantity of the solid will pass through the orifices unless the insert is agitated. It will thus be seen that an important feature of the present invention is use of the "bridging"

property of a fluent, solid material which enables the material to be suspended over an orifice without flowing therethrough. This bridging property will depend to a large extent on the coefficient of cohesion and the partical size of fluent, solid material, as well as particle shape, moisture content, and density thereof. Since bridging properties vary among materials, the minimum requirement of size, shape, and number of the spaced orifices will vary; generally, the greater the bridging effect which any particular fluent solid possesses, the larger the orifices in the bottom wall of the dispensing insert may be.

It has been found advantageous to form the insert with a side wall which has approximately the same dimensions as the inner surface of the mouth of the container. With the insert in position at the mouth of the container, the insert side wall presses against the inner surface of the container mouth or aperture and by the frictional engagement therebetween serves to maintain the insert in dispensing position at the aperture. The insert may also be formed with a flange which extends outwardly from the top of the insert side wall and over the facing which bounds the discharge aperture of the container. Such a flange not only serves to retain the insert in dispensing position by preventing it from falling within the container, but, if the insert is formed from a semi-rigid or a flexible material such as a flexible plastic material or aluminum, the flexible flange will be pressed into snug engagement with the rim of the container when the container cover has been screwed or otherwise disposed in container-closing position. The snug engagement of the flange and the container facing serves to seal the contents of the container from the ambient atmosphere. Sealing is particularly important when the contents of the container are such as possess volatile and fugacious aroma and flavor characteristics or the like, or are subject to deterioration upon exposure to the atmosphere. Thus, in a preferred embodiment, the dispensing insert serves the additional purpose of acting as a gasket for sealing the container.

The insert, itself, is preferably formed so that, when it is in place at the aperture of the container, the insert side wall will be disposed upwardly from the line of juncture of the bottom and side walls of the insert. In such position the insert, which is in the general form of an inverted cup, extends into the mouth of the container. The insert is formed with at least one orifice in its bottom wall preferably with a plurality of orifices extending therethrough. These orifices may be in the form of circles or, more preferably, triangles so positioned in the bottom wall that one angle of each triangle points toward the nearest spot on the line of juncture of the insert bottom and side walls.

These and other objects, features and advantages of the present invention will be better understood by reference to the illustration of the invention in the annexed drawing, which forms a part hereof and in which:

FIG. 1 is a side elevational view, partly in section, showing a preferred embodiment of the combination of the invention;

FIG. 2 is a horizontal sectional view taken along the line 2—2 of FIG. 1;

FIG. 3 is a perspective view, partly in section, of an empty insert of the invention;

FIG. 4 is a perspective view, partly in section, of the insert of FIG. 3 filled with pulverulent material; and FIG. 5 is a perspective view of a modified form of the insert of the invention.

Referring now to the drawing and in particular to FIG. 1 thereof, the present invention is illustrated therein as basically including a container 10 having contained therein a quantity of a solid, pulverulent material 11. The container is provided with a cover 12 and an insert 13 is disposed between the cover 12 and the container itself. Container 10, which is formed with a continuous side wall 14 having inner and outer surfaces identified by reference numerals 15 and 16, respectively, has conventional screw threads 18 formed in an upper portion of side wall 14. Screw threads 18 serve to permit rotation of depending, thread-engaging flanges 19 of cover 12, so that the cover can be screwed down against the outer surface 16 of side wall 14 in the conventional manner. In the position of FIG. 1, cover 12 has been rotated to block the aperture 20, which forms the discharge mouth for the material 11 within the container 10.

As illustrated in FIGS. 1, 2, and 3, the insert which acts to deter passage of the container contents 11 through the aperture 20 upon inversion of the container is formed from a continuous sheet of material, e.g., a flexible plastic such as polyethylene. Insert 13 has a substantially circular bottom wall 22 which is joined to a continuous side wall 23 along a circular line of juncture 24. At its end opposite the line of juncture 24, side wall 23 is formed with an integral, annular flange 25 which extends outwardly away from the bottom wall 22 and overlies the facing 27 formed in container side wall 14 and extending around aperture 20. In the illustration in FIG. 1, insert 13 is shown to be of such dimensions that, when in place at the aperture 20 of a container 10, whose contents it is intended to dispense, side wall 23 of the insert snugly engages inner surface 15 of container wall 14. In this position insert 13 is held in dispensing position by means of the frictional engagement between the elastic side wall 23 and the inner surface 15, and additionally by means of the overlying flange 25 resting on the facing 27 of container wall 14. With the cover 12 in fully screwed-down position, that cover presses against flange 25 and additionally serves to hold the insert 13 in place.

The precise shape of insert 13 is well illustrated in FIG. 3. It may there be seen that insert bottom wall 22 is inclined upwardly or domed within the region enclosed by annular side wall 23 to a zenith just below the plane of the flange 25. Bottom wall 22 should closely approach but not touch the cover 12 when the latter is in container-closing position. If bottom wall 22 and cover 12 do touch, the cover will agitate the bottom wall as the cover is removed and thereby disrupt the bridging, solid material resting on the bottom wall 22. The surface of bottom wall 22 is not inclined or domed at continuous ring-like outer portion 29 thereof. Portion 29 adjoins the line of juncture 24 and functions to hold pulverulent material. It also acts as a barrier to undesirable discharge of material below the insert when the container is tilted to dislodge material on the insert.

Spaced along the surface of bottom wall 22 and extending therethrough at locations ranging from the zenith to the rim of the domed portion are a plurality of orifices 28, which in FIGS. 1 to 3 are illustrated in the form of triangles. These triangles are so spaced along the bottom wall 22 of insert 13 that one angle of each triangle points outwardly along a radius of said insert while the opposite side of the triangle runs perpendicular to said radius. It will be apparent that with the triangles so positioned on the inclined surface of bottom wall 22, there is more tendency for fluent solid material 11 within the container 10 to bridge the triangles than to flow through the triangles back into the interior of container 10. This is because bridging occurs progressively over the area of an orifice by the cohesive accumulation of successive particles and can be promoted or induced by providing the orifice with an angular apex oriented at the best position to receive the falling particles and thus start the progressive cohesive accumulation thereof. For the same reasons, the shape and orientation of the orifices act to retard bridging and to induce particle flow therethrough in the opposite direction, when the container is inverted, since the particles are falling against a side edge of the orifice which cannot as readily start the progressive particle build-up to achieve a bridging effect. The combinational effect of providing an apex or vertex in each orifice formed in the dome-shaped bottom surface of the insert, which vertex is oriented so as to point away from the center of said insert and thus downwardly relative to said bottom surface, results in a limited and increasingly restrictive opening in the downstream direction for resisting gravitational flow therethrough of the fluent solid above said bottom surface and thereby promoting the orifice bridging action. FIG. 4 shows insert 13 completely filled with pulverulent material 11, all of the material bridging the orifices 28 and remaining on the bottom wall 22.

In a further modification of the invention illustrated in FIG. 5, an insert 30 is shown with an inclined bottom wall 31 and orifices 32 extending therethrough at spaced intervals. Circular orifices 32 are useful for obtaining a bridging effect with many different fluent solids, but the triangles illustrated in FIGS. 1 to 3 have been found superior to circular orifices in many respects.

In operation, the container 10 together with pulverulent solid 11, insert 13, and cover 12 in the position illustrated in FIG. 1 is inverted. By such inversion and a moderate amount of agitation of the container, the fluent solid 11 will flow through apertures 28 in insert 13 and will be supported by the inner surface of the cover 12, the material 11 being prevented from being discharged from the container by the pressure of cover 12 against flange 25 of insert 13. With sufficient agitation, all the space between cover 12 and insert 13, which represents a volumetric measuring chamber, will be filled with the solid. The container 10 is then gently returned to upright position with the cover 12 still in place. Because the size and number of apertures 28 have previously been determined with respect to the physical properties of the material within the container, no substantial amount of that material will flow back into the container through apertures 28, but the material 11 will bridge the apertures and the insert will be filled with that material and assume the appearance shown in FIG. 4. While maintaining the container 10 in upright position, cover 12 is unscrewed and container 10 then canted and the side wall 14 thereof gently tapped. In canted position tapping will effect the release of the pulverulent material 11 from the insert 13, and substantially all of that material will be discharged from the insert into a receptacle or the like.

By means of the structure and method described hereinbefore, a predetermined quantity of fluent, solid material can be metered from a container simply and quickly. The quantity of material to be dispensed from the container is determined in advance. This quantity is approximately equal to the volume between the inner surface of the container cover and the upper surface of the bottom wall of the insert. Consequently, variations in the length of the side wall of the insert and the degree of inclination of the bottom wall thereof will alter the quantity of solid material dispensed in a cycle of operation. Variations can also be made in the diameter of the aperture of the container in which the insert is to be located.

The degree of bridging will, as stated, be modified in accordance with physical characteristics of the material to be dispensed. Among those variables which will determine the bridging properties of a material are the particle size and shape, coefficient of cohesion, moisture content and density of the material. Among those materials successfully dispensed by means of a device such as that illustrated and described hereinbefore was a powderous, soluble coffee of the "instant" type. The coffee particles were spherical in shape and had diameters of from about 100 to 300 microns. The particles had a moisture content of 6 to 10% and a density of .19 to .21 g./cc. The particles, which had been produced by spray drying, had a coefficient of cohesion of about 55 to 60 units. This material was successfully bridged on an insert having spaced, congruent triangles with altitudes of .26 inch and bases of .30 inch. Eight triangles were spaced along the surface of an insert having a bottom wall 1.437 inch in diameter and having an inclination from zenith to line of juncture of .625 inch.

It will be obvious that alterations and modifications such as would occur to one skilled in this art can be made in the preferred embodiment and modification illustrated in the drawing and described hereinbefore without departing from the purview of the invention. It is desired, therefore, that the invention as set forth herein be understood to include all such alterations and modifications and that it be limited only by the scope of the following, appended claims.

I claim:

1. A device for dispensing metered quantities of a fluent solid, comprising a container for said solid, said container having a base on which it rests in upright position and a side wall forming an aperture through which said solid can be discharged, a closure for said container removably mounted over said aperture and against said side walls, and an insert disposed at said aperture to define a volumetric measuring chamber with said closure, said insert being provided with an upwardly recessed bottom wall which extends across said aperture, said bottom wall being formed with a plurality of orifices each shaped to define a vertex directed downwardly and away from the center of said insert and being of such dimensions and so located that when said container has been inverted and agitated the space between said bottom wall and said closure defining said chamber is substantially filled with said solid, and when said container is then brought to upright position said solid will bridge said orifices by virtue of its coefficient of cohesion and said chamber will remain substantially filled.

2. The invention according to claim 1 wherein said insert includes a side wall frictionally engaging the side wall of said container to removably seat said insert across said aperture.

3. The invention according to claim 2 wherein said insert side wall is formed with a flange outwardly turned to seat on the edge of the container side wall defining said aperture.

4. The invention according to claim 1 wherein the zenith of said upwardly recessed bottom wall is closely proximate said closure member.

5. The invention according to claim 4 wherein the portion of said closure member mounted over said aperture lies substantially in the plane of said aperture.

6. An insert for dispensing metered quantities of a fluent solid from a container provided with a removable closure for covering the dispensing aperture of said container, said insert comprising a side wall engaging the side wall of said container to support said insert within the mouth of said container, and a bottom wall joined to said insert side wall and extending across the mouth of said container to define a volumetric measuring chamber with said closure, said bottom wall being provided with an upwardly recessed portion formed with a plurality of orifices each shaped to define a vertex directed downwardly and away from the center of said insert and being of such dimensions and so located that when said container has been inverted and agitated the space between said bottom wall and said closure defining said chamber is substantially filled with said solid, and when said container is then brought to upright position said solid will bridge said orifices by virtue of its coefficient of cohesion and said chamber will remain substantially filled.

7. An insert for dispensing metered quantities of a fluent solid from a container provided with a removable closure covering the dispensing aperture of said container, said insert comprising a side wall engaging the side wall of said container to support said insert within the mouth of said container, and a bottom wall joined to said insert side wall and extending across the mouth of said container to define a volumetric measuring chamber with said closure, said bottom wall being provided with an upwardly recessed portion formed with a plurality of orifices each shaped to define a vertex directed downwardly and away from the center of said insert and being of such dimensions and so located as to impede the bridging of said orifices by said solid exterior of said chamber under influence of gravity when said container is inverted, and to promote bridging of said orifices by said solid within said chamber under the influence of gravity when said container is restored to upright position.

8. An insert for dispensing metered quantities of a fluent solid from a container, comprising a cup of such dimensions as to enable it to block the mouth of the container, said cup having a bottom wall adapted to be disposed at least partly within the mouth of the container and a side wall joined to said bottom wall along a line of juncture of said walls, said side wall extending upwardly from said line of juncture, said bottom wall extending substantially horizontally inwardly from said line of juncture and then being inclined upwardly away from said side wall to form an annular trough adjoining said line of juncture, said bottom wall having at least one orifice extending therethrough, and a flange integral with said side wall at the edge of the latter opposite said line of juncture and turned outwardly away from said bottom wall to releasably hold said cup in a position in which said bottom wall lies at least partly within and blocks the mouth of the container.

9. An insert for dispensing metered quantities of a fluent solid from a container, comprising a cup of such dimensions as to enable it to block the mouth of the container, said cup having a bottom wall and a side wall joined thereto along a line of juncture of said walls, said bottom wall inclining away from said line of juncture within the space bounded by said side wall, said bottom wall having extending therethrough a plurality of orifices spaced along the inclined surface of said bottom wall, said orifices having the general outline of isosceles triangles when viewed both from above and below said bottom wall, said triangles being positioned so that the angle of each of said triangles created by the intersection of two equal sides is bisected by a straight line drawn through said angle and to the closest point in said line of juncture.

10. A device for dispensing metered quantities of a fluent solid, comprising a container for said solid, said container having a base on which it rests in upright position and a side wall forming an aperture through which such solid can be discharged, a closure for said container removably mounted over said aperture and against said side wall, and an insert disposed at said aperture to define a volumetric measuring chamber with said closure, said insert being formed with an upwardly recessed bottom wall which extends across said aperture, said bottom wall being formed with a plurality of triangular shaped orifices of which one angle thereof points directly away from the center of said insert and being of such dimensions and so located as to impede the bridging of said orifices by said solid exterior of said chamber under influence of gravity when said container is inverted, and to promote bridging of said orifices by said solid within said chamber under the influence of gravity when said container is restored to upright position.

11. The invention according to claim 10 wherein the side of each said orifice opposite said one angle extends perpendicularly to the direction in which said one angle points.

12. The invention according to claim 10 wherein said orifices are so located with respect to said bottom wall as to enable said solid to substantially fill said chamber when said container is inverted.

13. The invention according to claim 12 wherein at least one of said orifices is located adjacent the rim of the recess in the bottom wall of said insert.

14. The invention according to claim 10 wherein the recess in said bottom wall is dome shaped.

References Cited by the Examiner
UNITED STATES PATENTS

| | | | |
|---|---|---|---|
| 42,934 | 5/1864 | Ewbank | 222—196.4 |
| 456,709 | 7/1891 | Stoddard et al. | 222—425 |
| 472,532 | 4/1892 | Farrington | 222—547 |
| 1,411,594 | 4/1922 | Sweet | 222—564 |
| 2,205,040 | 6/1940 | Kasin | 222—196.2 |

RAPHAEL M. LUPO, *Primary Examiner.*

LOUIS J. DEMBO, *Examiner.*

H. S. LANE, *Assistant Examiner.*